US009811649B2

(12) United States Patent
Pfursich et al.

(10) Patent No.: US 9,811,649 B2
(45) Date of Patent: Nov. 7, 2017

(54) SYSTEM AND METHOD FOR FEATURE-BASED AUTHENTICATION

(71) Applicant: Intel Corporation, Santa Clara, CA (US)

(72) Inventors: Scott Pfursich, Hillsboro, OR (US); David L. Graumann, Hillsboro, OR (US); Ranjit S Narjala, Portland, OR (US); Rahuldeva Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/645,970

(22) Filed: Mar. 12, 2015

(65) Prior Publication Data
US 2016/0140332 A1 May 19, 2016

Related U.S. Application Data

(60) Provisional application No. 62/079,072, filed on Nov. 13, 2014.

(51) Int. Cl.
G06F 21/00 (2013.01)
G06F 21/32 (2013.01)
G06K 9/00 (2006.01)

(52) U.S. Cl.
CPC ........ *G06F 21/32* (2013.01); *G06K 9/00255* (2013.01); *G06K 9/00288* (2013.01); *G06K 9/00899* (2013.01)

(58) Field of Classification Search
None
See application file for complete search history.

(56) References Cited

U.S. PATENT DOCUMENTS

| | | | | |
|---|---|---|---|---|
| 6,195,455 B1* | 2/2001 | Mack | ................. | H04N 13/0207 348/42 |
| 7,616,784 B2* | 11/2009 | Kocher | ............. | G06K 9/00906 382/115 |
| 7,986,816 B1* | 7/2011 | Hoanca | .............. | G06K 9/00597 382/115 |
| 8,457,367 B1* | 6/2013 | Sipe | .................... | G06K 9/00221 382/118 |

(Continued)

FOREIGN PATENT DOCUMENTS

| | | | |
|---|---|---|---|
| WO | WO-2013027893 A1 | 2/2013 | |
| WO | WO 2013095671 A1 * | 6/2013 | ........... G06F 1/3231 |

(Continued)

OTHER PUBLICATIONS

"International Application Serial No. PCT/US2015/060369, International Search Report mailed Mar. 3, 2016", 3 pgs.

(Continued)

*Primary Examiner* — Maung Lwin
(74) *Attorney, Agent, or Firm* — Schwegman Lundberg & Woessner, P.A.

(57) ABSTRACT

A system and method for capturing an image of a user. An image is captured with a camera, wherein the image includes a user's image. A first avatar is displayed in a display, wherein displaying includes positioning an avatar in at least some of the user's image. The user is then encouraged to move so the first avatar moves to a second position in the display.

26 Claims, 10 Drawing Sheets

(56) References Cited

U.S. PATENT DOCUMENTS

| | | | | |
|---|---|---|---|---|
| 8,594,374 B1* | 11/2013 | Bozarth | ............ | G06K 9/00604 382/103 |
| 8,724,856 B1* | 5/2014 | King | ................ | G06K 9/00221 340/5.82 |
| 8,856,541 B1* | 10/2014 | Chaudhury | ............ | G06F 21/32 382/115 |
| 2007/0288748 A1* | 12/2007 | Kakiuchi | .............. | G06F 21/316 713/159 |
| 2008/0063244 A1* | 3/2008 | Tanaka | ............... | G06K 9/00033 382/115 |
| 2009/0207251 A1* | 8/2009 | Kobayashi | ........ | G06K 9/00597 348/156 |
| 2009/0217211 A1* | 8/2009 | Hildreth | ................. | G06F 3/017 715/863 |
| 2010/0205667 A1* | 8/2010 | Anderson | ............... | G06F 3/013 726/19 |
| 2011/0274318 A1* | 11/2011 | Shindo | .................. | A61B 5/117 382/115 |
| 2012/0123786 A1* | 5/2012 | Valin | .................... | G06Q 20/105 704/273 |
| 2013/0015946 A1* | 1/2013 | Lau | .......................... | G07C 9/00 340/5.2 |
| 2013/0086674 A1* | 4/2013 | Horvitz | .................. | G06F 21/32 726/19 |
| 2013/0148850 A1* | 6/2013 | Matsuda | ............ | G06K 9/00362 382/103 |
| 2014/0006794 A1 | 1/2014 | Odessky et al. | | |
| 2014/0015930 A1 | 1/2014 | Sengupta | | |
| 2014/0075548 A1 | 3/2014 | Sampathkumaran et al. | | |
| 2014/0109010 A1* | 4/2014 | Casey | .................... | G06F 21/31 715/835 |
| 2014/0206389 A1* | 7/2014 | Aldana | ................ | H04W 4/021 455/456.2 |
| 2015/0026797 A1* | 1/2015 | Cao | ........................ | G06F 21/32 726/19 |
| 2015/0125048 A1* | 5/2015 | Ikenoue | ............ | G06K 9/00288 382/118 |

FOREIGN PATENT DOCUMENTS

| | | | | |
|---|---|---|---|---|
| WO | WO-2013100430 A1 | | 7/2013 | |
| WO | WO 2013100898 A1 * | | 7/2013 | ......... G06K 9/00288 |

OTHER PUBLICATIONS

"International Application Serial No. PCT/US2015/060369, Written Opinion mailed Mar. 3, 2016", 9 pgs.

* cited by examiner

SYSTEM AND METHOD FOR FEATURE-BASED AUTHENTICATION

RELATED APPLICATIONS

This application claims the benefit of priority to U.S. Provisional Application Ser. No. 62/079,072, filed Nov. 13, 2014, which is incorporated herein by reference in its entirety.

BACKGROUND

Facial recognition software can be used to make your computer system more secure by allowing access to a computer based on your facial features. A camera connected to your computer captures an image of your face, registers that image and then authenticates the user based on the registered image.

Most facial recognition user interfaces show the user what the camera sees. This presents a few problems. First, it shows the user a "reflection" of themselves at potentially unsightly times, such as when they just woke up if they have a problem with their hair, makeup, have food on their face, etc. This can distract a user from their original goal of logging into the system, and focus them instead on how they need to fix themselves up.

Second, it could signal to the user that the system is recording their image each time they log on to their computer. They might be under the impression that their device has a hoard of potentially compromising personal images that they have no control over and no ability to delete, which might someday get "hacked" and "leaked" like in any of a number of celebrity photo scandals.

Third, by showing the image captured of the user's face, one may open security holes where an attacker can gain valuable knowledge of security measures (such as anti-spoofing technology) being used by the system.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As noted above, facial recognition software can be used to make a computer system more secure by authenticating users based on their facial features. A camera connected to a computer captures an image of the user's face, registers that image and then authenticates the user based on the registered image. Other body parts, such as a hand, can be used as well.

Figure 1:
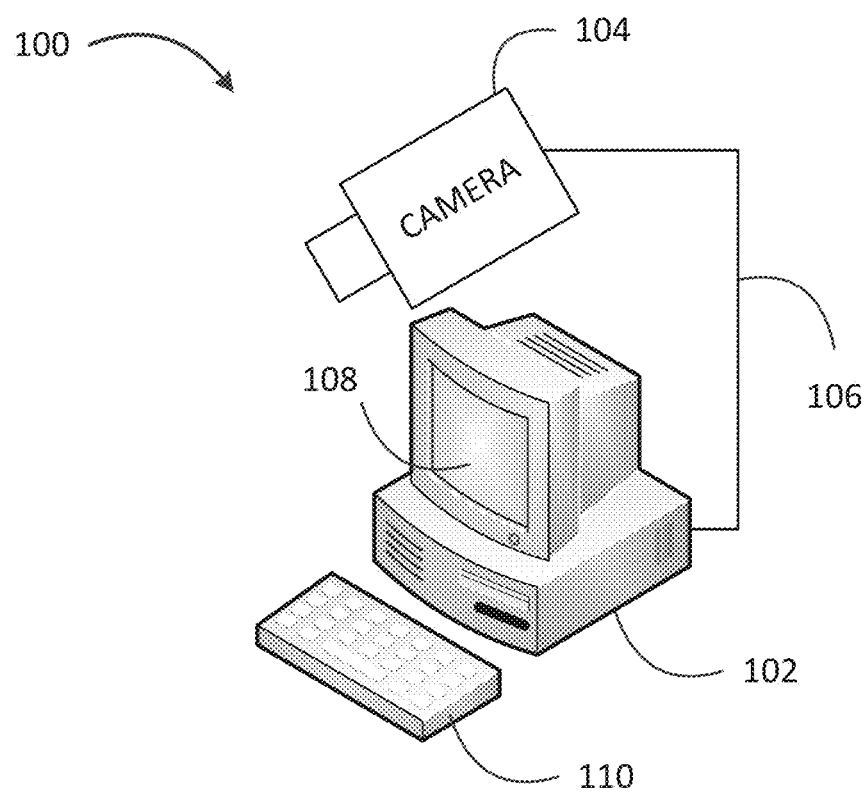
FIG. 1 illustrates a feature-based authentication system.

FIG. 1 illustrates a feature-based authentication system 100. System 100 of FIG. 1 includes a computing system 102 connected to one or more cameras 104 via a connector 106. In some embodiments, computer system 102 includes a display 108, a processor and memory used to store data and programs. In some embodiments, an input device 110 (such as, for example, a keyboard or a mouse) is connected to computing system 102 as well. In some embodiments, connector 106 is a Universal Serial Bus (USB) cable, while in other embodiments, connector 106 is a network such as Ethernet.

As noted above, most facial recognition user interfaces show the user what the camera sees. In contrast, computer system 102 displays an avatar representing the user on display 108. In some such embodiments, display 108 displays an avatar image 120 that approximates the user's image. One such avatar image 120 is shown in FIG. 2.

Figure 2:
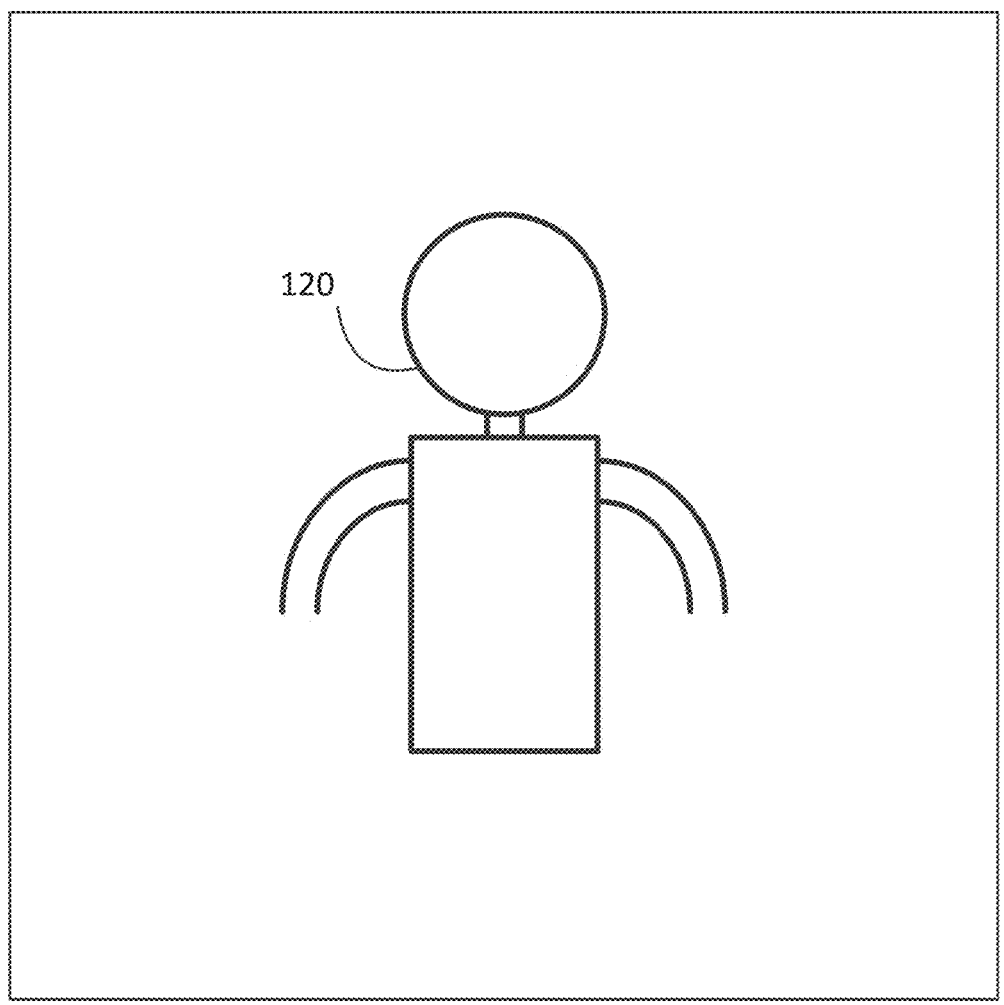
FIG. 2 illustrates an example of the use of an avatar in the authentication system of FIG. 1.

In the example avatar image embodiment shown in FIG. 2, a vaguely humanoid avatar 120 is displayed on display 108 in a position corresponding to where the user would be displayed if an image captured by camera 104 was displayed on display 108. In some embodiments, avatar 120 is displayed against a uniform background. In other embodiments, avatar 120 is displayed against a user-selectable background. In yet other embodiments, avatar 120 is displayed on top of the image captured by camera 104 so that avatar 120 covers all or most of the user in order to obscure their features.

In one embodiment, system 100 captures an image of the user, wherein the image includes a user image portion and a remaining portion, and displays an avatar 120 on display 108, wherein displaying includes obscuring at least some of the user image portion of the image with the avatar. System 100 then authenticates the user as a function of user image portions obscured or replaced by avatar 120.

Figure 3:
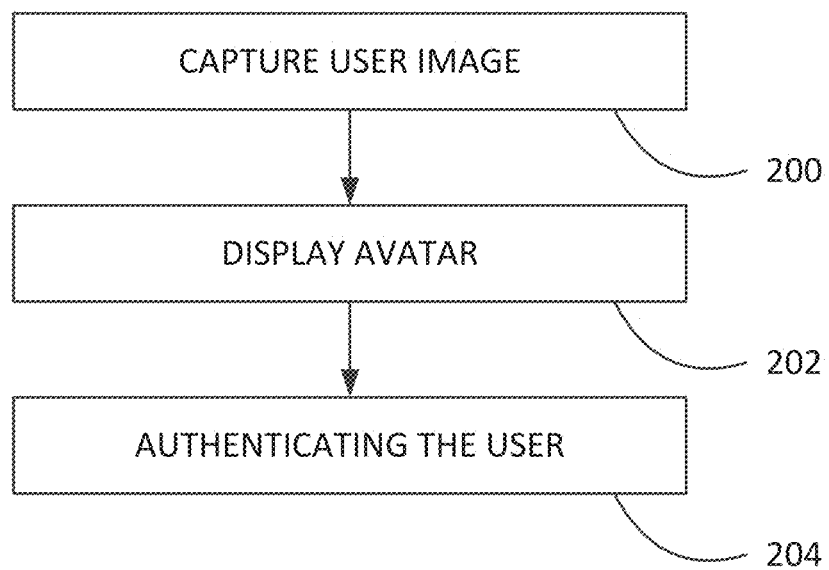
FIG. 3 illustrates an avatar-based approach to authentication.

In one embodiment, as shown in FIG. 3, system 100 captures the user image at 200 and displays an avatar at 202 in approximately the user's position in the image. In some embodiments, the user is then authenticated at 204 as a function of the user image portions obscured or replaced by avatar 120. In some such embodiments, authentication is based on feature recognition software such as facial recognition software. In other embodiments, authentication is based on feature recognition analysis of other body parts, such as hands, feet, or the shape of the eyes.

The avatar-based approach to authentication can be used to reduce spoofing. For instance, one way to reduce spoofing is to have the user move and check to see that the movement is reflected in the image captured by system 100. For instance, if the background moves with the user in relation to camera 104, this is an indication that someone may be trying to spoof system 100 with a static image.

Figure 4:
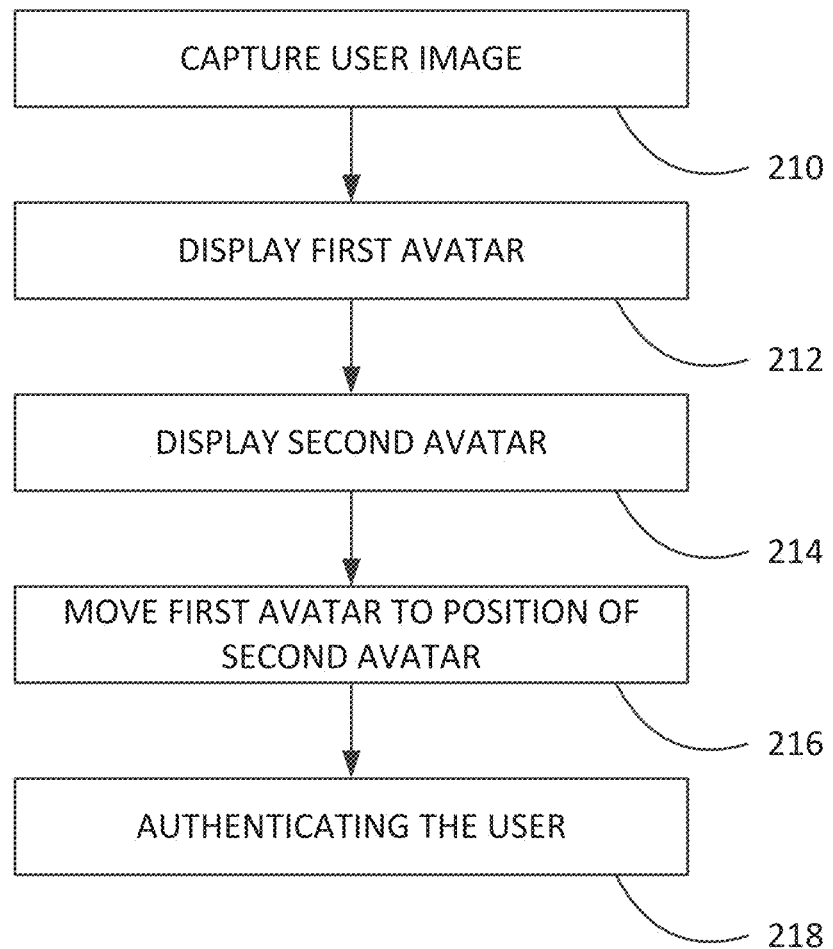
FIG. 4 provides another example of an avatar-based approach to authentication.

In the embodiment shown in FIG. 4, the user is encouraged to move by capturing the user's image at 210, displaying a first avatar in the user's position at 212, displaying, at 214, a second avatar in a particular position of the display, and then encouraging, at 216, the user to move so the first avatar moves to the position of the second avatar. In some embodiments, a user is then authenticated at 218 as a function of the features of the user in the original image.

In one such embodiment, system 100 captures an image of the user, displays a first avatar in a first position corresponding to the user's position in display 108, displays a second avatar in a second position in the display 108, and encourages the user to move so the first avatar moves to the second position in the display 108. As noted above, in some embodiment, the user is then authenticated as a function of the features of the user in the original image.

In one embodiment, system 100 captures an image of the user, wherein the image includes a user image portion and a remaining portion, and displays an avatar in the user's position on display 108, wherein displaying includes obscuring at least some of the user image portion of the image with the avatar. System 100 also displays a second avatar in a second position in the display 108 and encourages the user to move so the first avatar moves to the second position in display 108. In some embodiments, system 100 then authenticates the user as a function of the user image portions obscured by the first avatar.

Figure 5:
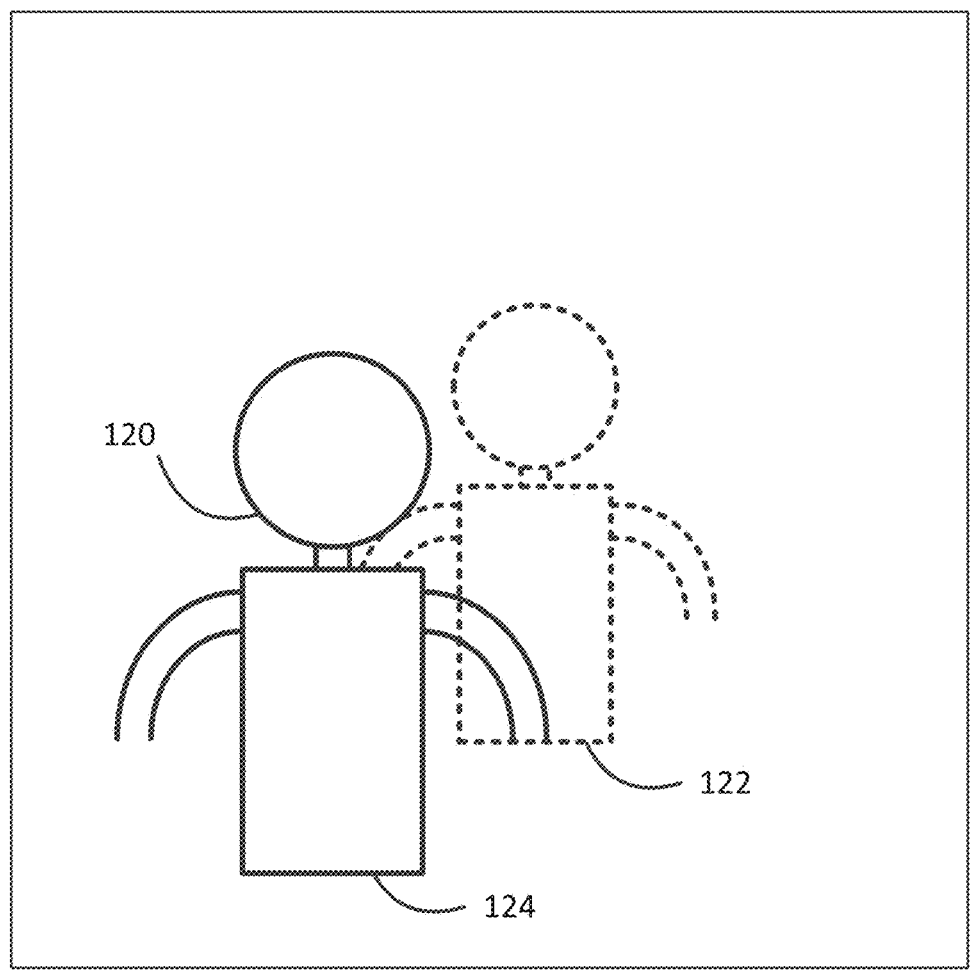
FIG. 5 illustrates another example of the use of an avatar in the authentication system of FIG. 1.

In the avatar image embodiment shown in FIG. 5, the avatar 120 begins at position 124 and moves to position 122 in response to movement by the user. The position 124 is used to reflect the user's current position with respect to the target position 122. Note that target avatar position 122 is represented in these figures using a dashed line merely for illustrative purposes. The target avatar position 122 may be presented in various manners including using solid lines, lighter or darker shaded lines, partially translucent lines, solid color blocks, etc. The type, color, weight, or other characteristics of the working avatar (e.g., that shown at position 124) and the target avatar position 122 may be used to convey additional information, as described later. Not only does this address the issues mentioned above, it also provides better guidance for directing the user into a particular position or to encourage the user to move a certain way. In the example shown in FIG. 5, avatar 120 moves from position 124 to position 122, following the user as they move in front of camera 104. In other embodiments, avatar 120 not only mimics the user's movements, but also guides them to move into a certain spot, or to perform a certain action, such as blinking or moving their head from side-to-side making a "no" gesture.

In one embodiment, when users wish to log into a device or website, they launch a facial biometric recognizing program and, instead of seeing the normal view of themselves, such as they would if they were taking a selfie, they would see an avatar mirroring their movements. In some such embodiments, avatar 120 is part of a scene that includes a desired position of the avatar (e.g., position 122 in FIG. 5), which functions as a guide to instruct the user how to move their face or body appropriately to get into the correct location. When the user aligns their avatar 120 with position 122, they are in the proper placement.

This method requires no instructions and is immediately understood by the participating user. It also prevents the user from thinking the application is storing full color images of themselves.

In some embodiments, camera 104 is continually capturing images and searching for a user in the captured images. When a user is detected, system 100 wakes up and displays avatar 120 on display 108 in the position of the user in the captured image. In some such embodiments, avatar 120 changes shape to indicate system 100 recognized your approach. In some such embodiments, for example, avatar 120 increases in size as the user approaches the camera. In some embodiments, system 100 also issues a signal such as a sound separately or in addition to the movement of the avatar 120 to recognize the user's approach.

In some embodiments, system 100 includes multiple cameras 104. In such embodiments, it can be difficult to determine the camera to which users are supposed to direct their attention. Without being able to see what the camera sees, they won't easily be able to tell which camera they need to look into. To get around that, in one embodiment, software executing on computer 102 recognizes a hand wave gesture. So, if the user is unsure of the right camera to use, they can wave their hand at it. When this gesture is recognized, there will be a ripple effect across user avatar 120. This signals that the hand wave gesture was done in front of the active camera 104.

Having this avatar 120 also enables much more feedback to the user. For instance, by changing the size of the user's avatar relative to how far the user is from the camera, we can invoke the user to move closer or farther away. If they are too close, their avatar becomes bigger relative to the stationary, target avatar at 122. If they are too far, their avatar is smaller. This is better than a circle they need to fill with their face because system 100 can instruct the user to do various things at the same time, such as blinking or head movement.

Figure 6:
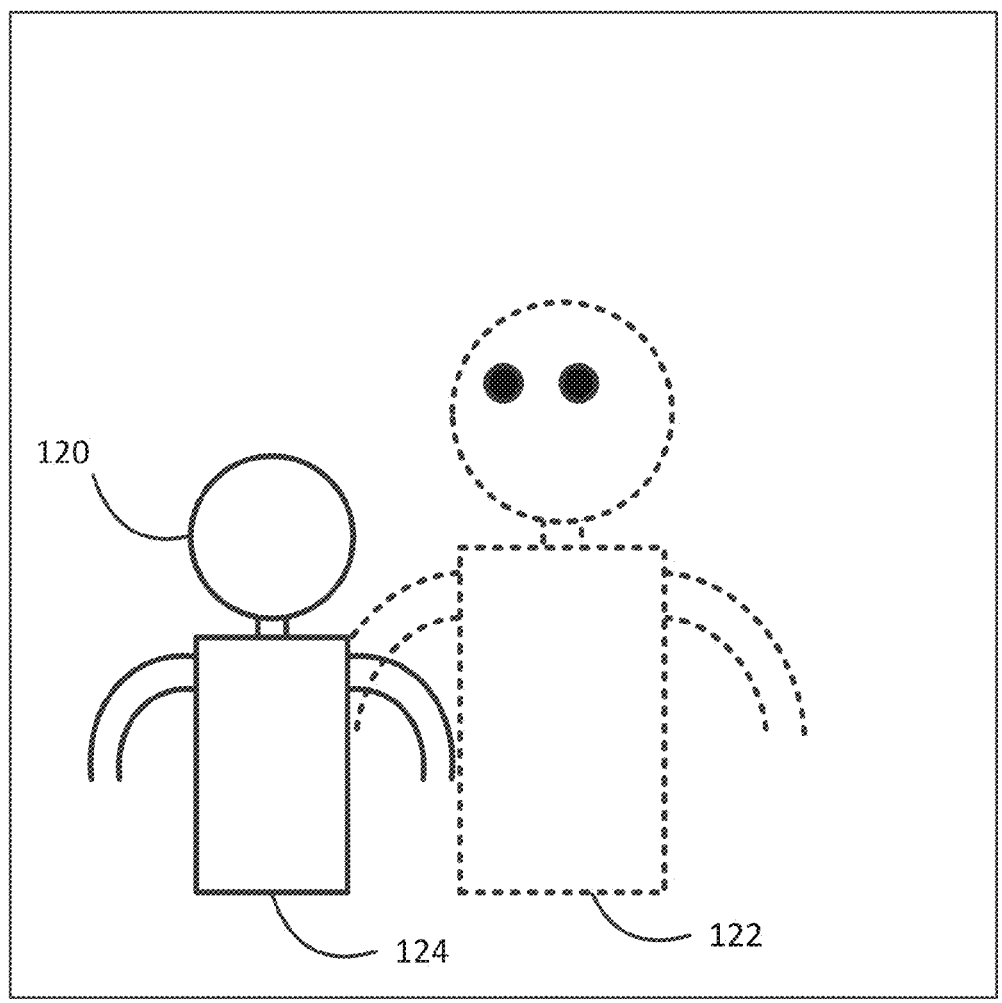
FIGS. 6 and 7 illustrate an example approach for soliciting movement by the user in the authentication system of FIG. 1.

As can be seen in FIG. 6, the reference avatar at position 122 could do actions such as blinking or making a movement of its head. Here, the reference avatar at position 122 is telling in the user to move right, move closer to camera 104, blink, and rotate their head, all at the same time with no words or instructions.

Figure 7:
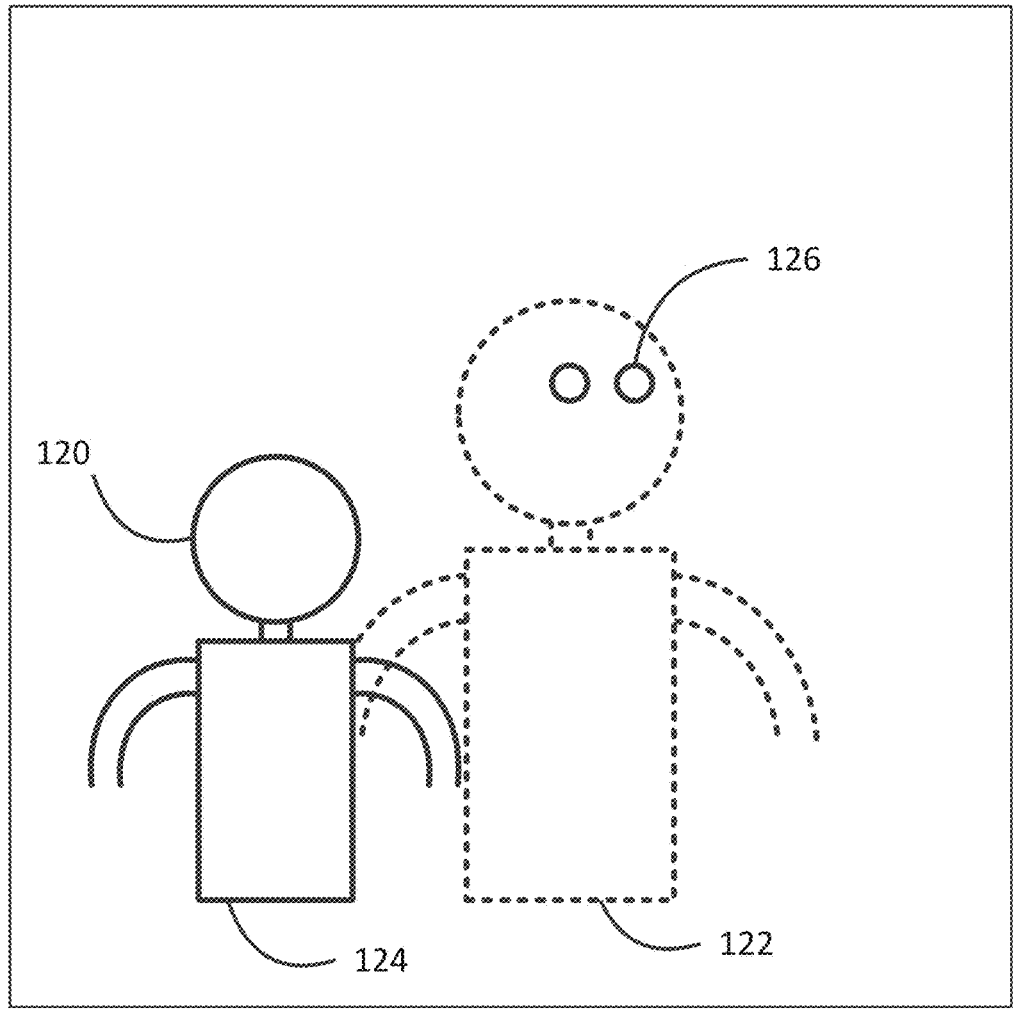

In the example embodiment shown in FIG. 7, the reference avatar at position 122 has shifted its head to the left from its position in FIG. 6 and has closed its eyes 126. The user will follow that movement naturally.

In some embodiments, the reference avatar at position 122 blinks its eyes 126 in a pattern that the user mimics. A successful sequence of blinks serves a part or all of the authentication mechanism.

In some embodiments, avatar 120 changes color as the user more closely mimics avatar 120. For instance, avatar 120 may start out red and change to green when avatar 120 is aligned with the avatar at position 122.

In one embodiment, system 100 encourages users to move relative to the camera changing the color of the second avatar in response to user movements in front of the camera. In one example embodiment, the second avatar has a head and the color of the second avatar changes as the head moves.

The approach described above is so flexible one can even tell each user about the environment instead of just their alignment and movements. For instance, in one embodiment, system 100 changes the outline color of avatar 120 to signal how easy it is for the application to see them. For example, in one such embodiment, a very dark blue avatar 120 indicates the lighting in the room is great and the user can be seen clearly. But if their avatar 120 has a very light color or has changed to a dashed outline instead of a solid line, it would signal that the lighting in the room is too dark.

Avatar 120 does not have to be humanoid in appearance. In the example embodiment shown in FIG. 8, an avatar 120 (here, a "smiley face") is placed in the user's position in the image captured by camera 104. In some embodiments, other, even less human-like avatars 120 (such as a circle or a blob) can be used. In some such embodiments, the size of avatar 120 is selected to approximate the user's size in the image. In the example given in FIG. 8, the smiley face or other abstract avatar) is placed in the position of the user's face. In other embodiments, the smiley face (or other abstract avatar) is placed at approximately the center of the portion of the user in the captured image.

Once again, avatar 120 can be displayed on a uniform background, or can be placed over the scene captured by camera 104 so the background of the scene is still visible.

Figure 9:
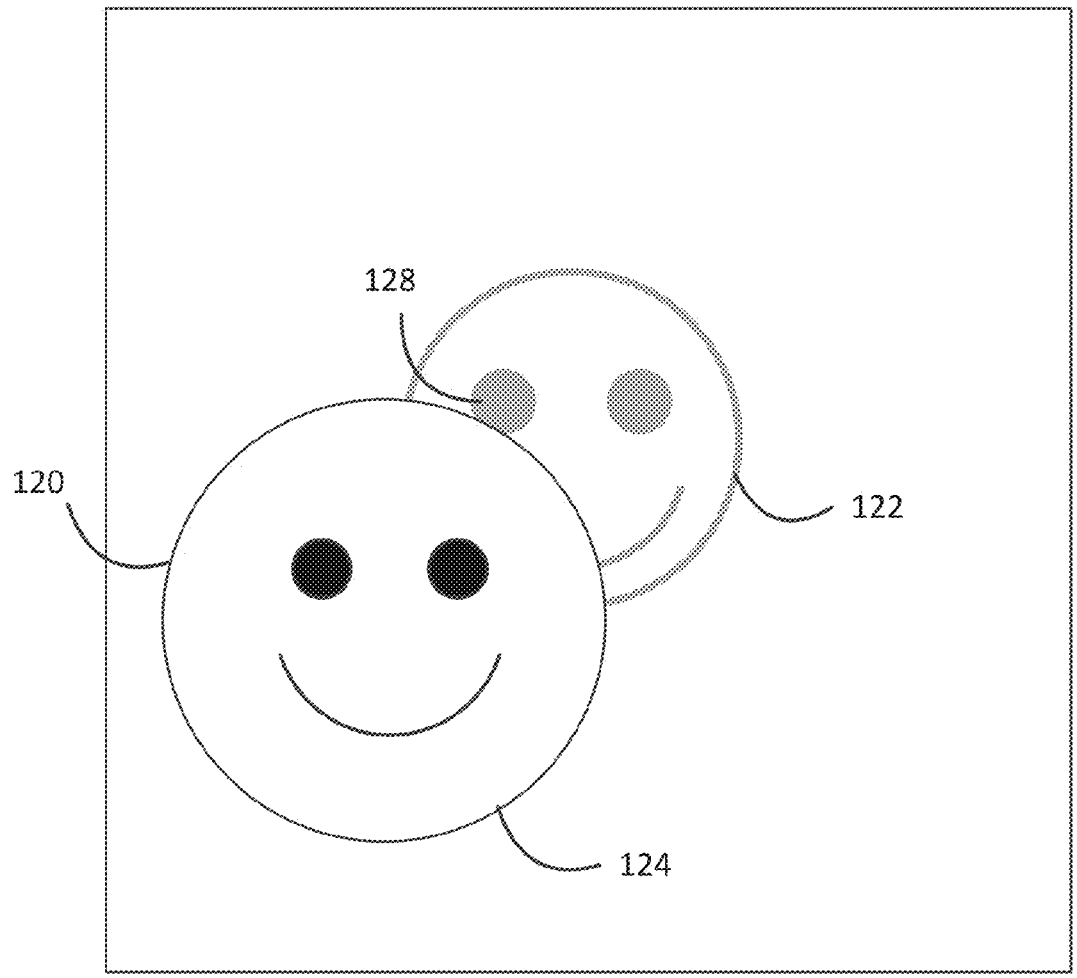
FIG. 9 illustrates another example approach for soliciting movement by the user in the authentication system of FIG. 1.

Also, as is shown in FIG. 9, in some embodiments, avatar 120 moves with the user from a position 124 to a position 122. Once again, avatar 120 can be sized and moved to enable much more feedback to the user. For instance, by changing the size of the user's avatar 120 relative to how far the user is from the camera (as shown in FIG. 9), we can invoke the user to move closer or farther away from camera 104. If they are too close, their avatar becomes bigger relative to the stationary, target avatar at 122. If they are too far, their avatar is smaller. Both approaches encourage the user to move toward or away from camera 104 in order to bring their avatar into the same scale as the target avatar.

Figure 8:
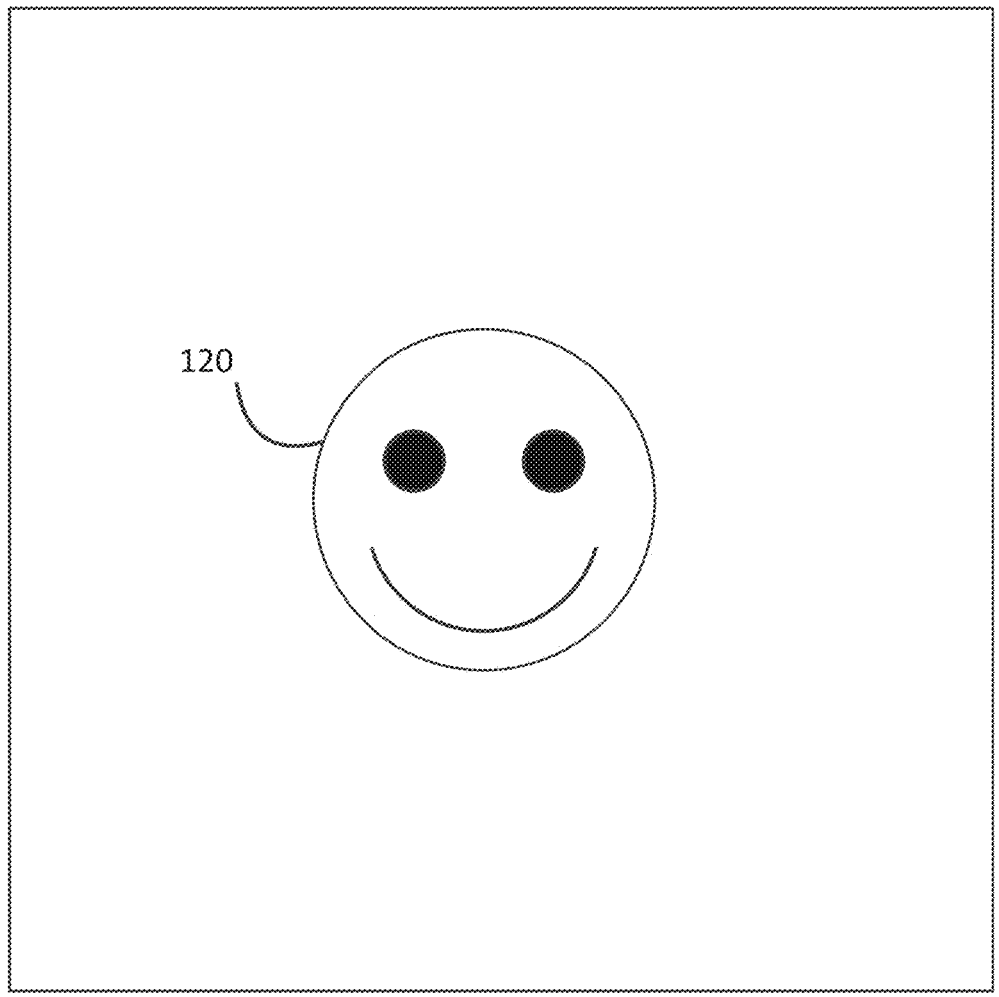
FIG. 8 illustrates another, more abstract, example of an avatar that can be used in the authentication system of FIG. 1.

In some embodiments, avatar 120 in FIGS. 8 and 9 provides feedback in the form of changes in the shape of avatar 120. For instance, in one embodiment, avatar 120 ripples and moves in response to movement on the part of the user as discussed with regard to the other avatars above.

In some embodiments, a computer 102 receives a series of images displaying an individual and displays an abstract symbol representing the individual. In some such embodiments, displaying includes changing the abstract symbol to correspond to movements by the individual in the series of images as described above. In some embodiments, computer 102 then authenticates the individual as a function of features (e.g., face, hands, feet, shape of eyes) of the individual selected from the captured images.

In some embodiments, the abstract symbol changes color to reflect an aspect of the captured images. In some such embodiments, the color is selected to indicate, for instance, lighting conditions.

In other embodiments, the color is selected to indicate distance of the first avatar from the second avatar. For instance, in some embodiments, the second avatar is outlined in red when the first avatar is separate from the second avatar, but slowly changes to green as the first avatar moves on top of the second avatar. This provides visual feedback with respect to the user's movement.

In some embodiments, displaying an abstract symbol includes causing ripples to appear in the abstract symbol when an individual cannot be identified in the series of images.

Figure 10:
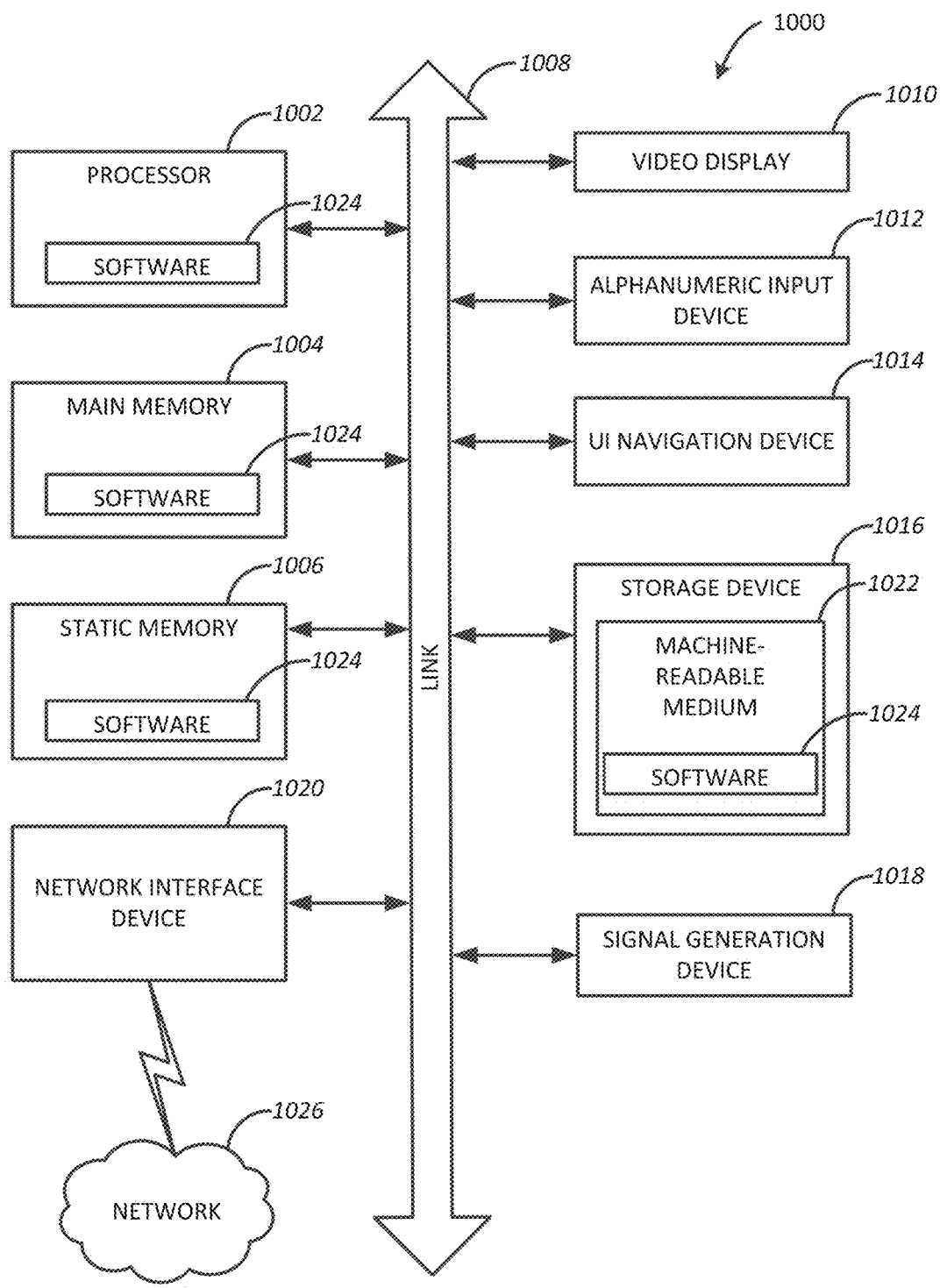
FIG. 10 is a block diagram illustrating an example machine upon which any one or more of the techniques (e.g., methodologies) discussed herein may perform, according to an example embodiment.

FIG. 10 is a block diagram illustrating a machine in the example form of a computer system 102, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 102 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 102 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 102 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 102, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples Example 1 includes subject matter for a user authentication system (such as a device, apparatus, or machine) comprising a camera, a display and a processor, connected to the camera and the display. The processor receives images from the camera, searches for a user, displays a first avatar on the display in the user's position, encourages the user to move relative to the camera so as to place the user in a position in the images corresponding to a second position on the display, and authenticates users based on the images.

In Example 2, the subject matter of Example 1 may include, wherein the images are video frames.

In Example 3, the subject matter of any one of Examples 1 to 2 may include, wherein the processor encourages users to move relative to the camera by displaying a second avatar in the second position on the display.

In Example 4, the subject matter of any one of Examples 1 to 3 may include, wherein displaying a first avatar in a display includes replacing at least some of the user's image with the first avatar.

In Example 5, the subject matter of any one of Examples 1 to 4 may include, wherein displaying a first avatar in a display includes displaying the first avatar in a position corresponding to the user's position in the captured image.

In Example 6, the subject matter of any one of Examples 1 to 5 may include, wherein processor detects spoofing by reviewing movement of the user relative to the user's background.

In Example 7, the subject matter of any one of Examples 1 to 6 may include, wherein the processor authenticates the user based on a user feature in the user's image.

In Example 8, the subject matter of any one of Examples 1 to 7 may include, wherein the processor determines, for each selected image segment, a desired pixel wherein the processor authenticates the user based on a user feature in the user's image only when spoofing is not suspected.

In Example 9, the subject matter of any one of Examples 1 to 8 may include, wherein the user feature is a face and wherein authenticating the user based on the user feature includes detecting the user's face in the user's image and authenticating the user based on facial features in the user's image.

In Example 10, the subject matter of any one of Examples 1 to 9 may include, wherein authenticating includes executing a cloud-based authentication routine.

In Example 11, the subject matter of any one of Examples 1 to 10 may include, wherein the processor scales the first avatar to a size proportional to the user's face.

In Example 12, the subject matter of any one of Examples 1 to 11 may include, wherein the processor increases the size of the first avatar as the user approaches the camera.

In Example 13, the subject matter of any one of Examples 1 to 12 may include, wherein the processor displays the first avatar automatically when the user approaches the camera.

In Example 14, the subject matter of any one of Examples 1 to 13 may include, wherein the processor displays the first avatar automatically when the user is detected within a predefined distance of the camera.

In Example 15, the subject matter of any one of Examples 1 to 14 may include, wherein the processor encourages users to move relative to the camera by displaying a second avatar in the second position on the display, wherein displaying a second avatar in a display includes changing color of the second avatar in response to user movements in front of the camera.

In Example 16, the subject matter of any one of Examples 1 to 15 may include, wherein the first avatar has a face and wherein the processor displays the first avatar's face in a location on the display in the vicinity of the position of the user's face in the captured image.

In Example 17, the subject matter of any one of Examples 1 to 16 may include, wherein displaying the first avatar's face includes increasing the size of the avatar's face as the user's face approaches the camera.

In Example 18, the subject matter of any one of Examples 1 to 17 may include, wherein displaying the first avatar's face includes selecting an avatar face size that is a function of the distance of the user's face from the camera.

In Example 19, the subject matter of any one of Examples 1 to 18 may include, wherein the camera is separate from the processor.

In Example 20, the subject matter of any one of Examples 1 to 19 may include, wherein the processor is in a computing device and wherein the camera is integrated into the computing device.

Example 21 includes subject matter (such as a method, means for performing acts, machine readable medium including instructions that when performed by a machine cause the machine to performs acts, or an apparatus to perform) comprising: capturing an image with a camera, wherein the image includes a user's image, displaying a first avatar in a display, wherein displaying includes positioning an avatar in at least some of the user's image, displaying a second avatar in a second position in the display and encouraging the user to move so the first avatar moves to the second position in the display.

In Example 22, the subject matter of Example 21 may include, wherein capturing images includes extracting the images from video.

In Example 23, the subject matter of any one of Examples 21 to 22 may include, wherein displaying a first avatar in a display includes replacing at least some of the user's image with the first avatar.

In Example 24, the subject matter of any one of Examples 21 to 23 may include, wherein displaying a first avatar in a display includes displaying the first avatar in a position corresponding to the user's position in the captured image.

In Example 25, the subject matter of any one of Examples 21 to 24 may include, wherein the method further comprises detecting spoofing by reviewing movement of the user relative to the user's background.

In Example 26, the subject matter of any one of Examples 21 to 25 may include, wherein the method further comprises authenticating the user based on a user feature in the user's image.

In Example 27, the subject matter of any one of Examples 21 to 26 may include, wherein authenticating includes detecting spoofing by reviewing movement of the user relative to the user's background.

In Example 28, the subject matter of any one of Examples 21 to 27 may include, wherein the user feature is a face and wherein authenticating the user based on the user feature includes detecting the user's face in the user's image and authenticating the user based on facial features in the user's image.

In Example 29, the subject matter of any one of Examples 21 to 28 may include, wherein authenticating includes executing a cloud-based authentication routine.

In Example 30, the subject matter of any one of Examples 21 to 29 may include, wherein the method further comprises searching for the user's face in the user's image and scaling the first avatar to a size proportional to the user's face.

In Example 31, the subject matter of any one of Examples 21 to 30 may include, wherein the method further comprises searching for the user in the captured image and increasing the size of the first avatar as the user approaches the camera.

In Example 32, the subject matter of any one of Examples 21 to 31 may include, wherein the method further comprises searching for the user in the captured image and wherein displaying a first avatar in a display includes displaying the first avatar when the user approaches the camera.

In Example 33, the subject matter of any one of Examples 21 to 32 may include, wherein the method further comprises searching for the user in the captured image and wherein displaying a first avatar in a display includes displaying the first avatar when the user is detected within a predefined distance of the camera.

In Example 34, the subject matter of any one of Examples 21 to 33 may include, wherein the method further comprises searching for the user in the captured image and wherein displaying a second avatar in a display includes changing color of the second avatar in response to user movements in front of the camera.

In Example 35, the subject matter of any one of Examples 21 to 34 may include, wherein the first avatar has a face and wherein the method further comprises searching for the user's face in the user's image and displaying the first avatar's face in a location on the display in the vicinity of the position of the user's face in the captured image.

In Example 36, the subject matter of any one of Examples 21 to 35 may include, wherein displaying the first avatar's face includes increasing the size of the avatar's face as the user's face approaches the camera.

In Example 37, the subject matter of any one of Examples 21 to 36 may include, wherein displaying the first avatar's face includes selecting an avatar face size that is a function of the distance of the user's face from the camera.

In Example 38, the subject matter of any one of Examples 21 to 37 may include, wherein the first avatar is an abstract symbol and wherein displaying the first avatar includes causing ripples to appear in the abstract symbol when an individual cannot be identified in the image.

In Example 39, the subject matter of any one of Examples 21 to 38 may include, wherein displaying a first avatar includes responding to gestures by the user by changing appearance of the avatar.

In Example 40, the subject matter of any one of Examples 21 to 39 may include, wherein responding to gestures by the user includes showing a ripple move across the avatar.

In Example 41, the subject matter of any one of Examples 21 to 40 may include, wherein responding to gestures by the user includes providing feedback to a user waving at a camera.

Example 42 includes at least one machine-readable medium including instructions, which when executed by a machine, cause the machine to perform operations of any of the Examples 21-41.

Example 43 includes an apparatus comprising means for performing any of the Examples 21-41.

Example 44 includes subject matter (such as a device, apparatus, or machine) comprising: a camera, a display, and a processor, connected to the camera and the display, wherein the processor includes means for receiving, from the camera, an image, wherein the image includes a user's image and wherein the means for receiving includes means for searching for a user feature in the user's image, wherein the processor also includes means for displaying a first avatar in the display, wherein displaying includes positioning the avatar in the display in the user's position and wherein the processor further includes means for encouraging the user to move relative to the camera so as to place the user in a position in the images corresponding to a second position on the display.

In Example 45, the subject matter of Example 44 may include, wherein the means for searching for a user feature includes means for extracting the image from a video frame.

In Example 46, the subject matter of any one of Examples 44 to 45 may include, wherein the means for encouraging the user to move relative to the camera includes displaying a second avatar in the second position on the display.

In Example 47, the subject matter of any one of Examples 44 to 46 may include, wherein the means for displaying a first avatar in a display includes means for replacing at least some of the user's image with the first avatar.

In Example 48, the subject matter of any one of Examples 44 to 47 may include, wherein the means for displaying a first avatar in a display includes means for displaying the first avatar in a position corresponding to the user's position in the captured image.

In Example 49, the subject matter of any one of Examples 44 to 48 may include, wherein means for searching for a user feature includes means for detecting spoofing by reviewing movement of the user relative to the user's background.

In Example 50, the subject matter of any one of Examples 44 to 49 may include, wherein the processor further includes means for authenticating the user based on a user feature in the user's image.

In Example 51, the subject matter of any one of Examples 44 to 50 may include, wherein the processor further includes means for detecting spoofing and means for authenticating the user based on a user feature in the user's image, wherein the user is only authenticated when spoofing is not suspected.

In Example 52, the subject matter of any one of Examples 44 to 51 may include, wherein the user feature is a face and wherein means for authenticating the user based on the user feature includes means for detecting the user's face in the user's image and authenticating the user based on facial features in the user's image.

In Example 53, the subject matter of any one of Examples 44 to 52 may include, rein the means for authenticating includes means for executing a cloud-based authentication routine.

In Example 54, the subject matter of any one of Examples 44 to 53 may include, wherein the means for displaying the first avatar scales the first avatar to a size proportional to the user's face.

In Example 55, the subject matter of any one of Examples 44 to 54 may include, wherein the means for displaying the first avatar increases the size of the first avatar as the user approaches the camera.

In Example 56, the subject matter of any one of Examples 44 to 55 may include, wherein the means for displaying the first avatar displays the first avatar automatically when the user approaches the camera.

In Example 57, the subject matter of any one of Examples 44 to 56 may include, wherein the means for displaying the first avatar displays the first avatar automatically when the user is detected within a predefined distance of the camera.

In Example 58, the subject matter of any one of Examples 44 to 57 may include, wherein the means for encouraging the user to move relative to the camera includes displaying a second avatar in the second position on the display, wherein displaying the second avatar includes changing color of the second avatar in response to user movements in front of the camera.

In Example 59, the subject matter of any one of Examples 44 to 58 may include, wherein the first avatar has a face and wherein the means for displaying the first avatar includes means for displaying the first avatar's face in a location on the display in the vicinity of the user's face in the captured image.

In Example 60, the subject matter of any one of Examples 44 to 59 may include, wherein the means for displaying the first avatar's face increases the size of the avatar's face as the user's face approaches the camera.

In Example 61, the subject matter of any one of Examples 44 to 60 may include, wherein the means for displaying the first avatar's face selects an avatar face size that is a function of the distance of the user's face from the camera.

In Example 62, the subject matter of any one of Examples 44 to 61 may include, wherein the means for encouraging the user to move relative to the camera includes displaying a second avatar in the second position on the display, wherein the second avatar has a head and wherein the color of the second avatar changes as the head moves.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user authentication system, comprising:
a camera;
a display; and
a processor, connected to the camera and the display, wherein the processor is to:
receive images from the camera;
search for a user in the received images;
display a first avatar in a first position on the display, the first position corresponding to the user's position;
display a second avatar at a second position on the display, the second avatar being different from the first avatar, and the displayed second avatar indicating a first movement pattern of the user relative to the camera and a second movement pattern associated with an action to be performed by the user while moving according to the first movement pattern,
wherein the first movement pattern includes one or more movements of the user to the left, right, front or back in relation to the camera, and wherein the user action of the second movement pattern is different from the one or more movements associated with the first movement pattern;
upon detecting a movement of the user relative to the camera, change one or more graphical characteristics of the first avatar, to guide the user to move according to the first movement pattern and the second movement pattern to a position in the images corresponding to the second position on the display; and
authenticate the user based on the images.

2. The system of claim 1, wherein the images are video frames and to display the first avatar, the processor is configured to:
obscure at least a portion of the user in the received images with the first avatar.

3. The system of claim 1, wherein the second movement pattern includes one or both of a blinking pattern and a head movement pattern.

4. The system of claim 1, wherein displaying the first avatar on the display includes replacing at least some of the user's image with the first avatar.

5. The system of claim 1, wherein displaying a first avatar in a display includes displaying the first avatar in a position corresponding to the user's position in the captured image.

6. The system of claim 1, wherein the processor detects spoofing by reviewing movement of the user relative to the user's background.

7. The system of claim 1, wherein the processor authenticates the user based on a user feature in the user's image.

8. The system of claim 1, wherein the processor authenticates the user based on a user feature in the user's image only when spoofing is not suspected.

9. The system of claim 8, wherein the user feature is a face and wherein authenticating the user based on the user feature includes detecting the user's face in the user's image and authenticating the user based on facial features in the user's image.

10. The system of claim 9, wherein authenticating includes executing a cloud-based authentication routine.

11. The system of claim 1, wherein the one or more graphical characteristics of the first avatar comprise a shape of the first avatar or a color of an outline of the first avatar.

12. At least one non-transitory machine-readable medium including instructions, which when executed by a machine, cause the machine to:
capture an image with a camera, wherein the image includes a user's image;
display a first avatar in a first position on a display, wherein the displaying includes positioning the first avatar in at least some of the user's image; and
display a second avatar in a second position in the display, the second avatar providing an indication for the user to move so the first avatar moves to the second position in the display,
wherein the second avatar is indicative of a first movement pattern and a second movement pattern to be performed by the user to move the first avatar to the second position, wherein the first movement pattern includes one or more movements of the user to the left, right, front or back in relation to the camera, and wherein user movement in connection with the second movement pattern is different from the one or more movements associated with the first movement pattern, and
wherein one or more graphical characteristics of the first avatar change during the movement to the second position according to the first movement pattern and the second movement pattern.

13. The at least one non-transitory machine-readable medium of claim 12, wherein the instructions to capture the image include instructions to extract the image from video.

14. The at least one non-transitory machine-readable medium of claim 12, wherein the instructions to display a first avatar in a display include instructions to replace the at least some of the user's image with the first avatar.

15. The at least one non-transitory machine-readable medium of claim 12, further comprising instructions to detect spoofing by reviewing movement of the user relative to the user's background.

16. The at least one non-transitory machine-readable medium of claim 12, further comprising instructions to authenticate the user based on a user feature in the user's image.

17. The at least one non-transitory machine-readable medium of claim 16, wherein the instructions to authenticate include instructions to detect spoofing by reviewing movement of the user relative to the user's background.

18. The at least one non-transitory machine-readable medium of claim 17, wherein the user feature is a face, and wherein the instructions to authenticate the user based on the user feature include instructions to detect the user's face in the user's image and authenticate the user based on facial features in the user's image.

19. The at least one non-transitory machine-readable medium of claim 12, further comprising instructions to search for the user's face in the user's image and scale the first avatar to a size proportional to the user's face.

20. The at least one non-transitory machine-readable medium of claim 12, further comprising instructions to search for the user in the captured image, and wherein the instructions to display a first avatar in the display include instructions to display the first avatar when the user approaches the camera.

21. The at least one non-transitory machine-readable medium of claim 12, further comprising instructions to search for the user in the captured image, and wherein the instructions to display a first avatar in the display include instructions to display the first avatar when the user is detected within a predefined distance of the camera.

22. The at least one non-transitory machine-readable medium of claim 12, further comprising instructions to search for the user in the captured image, and wherein the instructions to display a second avatar in the display include instructions to change color of the second avatar in response to user movements in front of the camera.

23. The at least one non-transitory machine-readable medium of claim 12, wherein the first avatar is an abstract symbol, and wherein the instructions to display the first avatar include instructions to cause ripples to appear in the abstract symbol when an individual cannot be identified in the image.

24. A method, comprising:
capturing an image with a camera, wherein the image includes a user's image;
displaying a first avatar in a first position on a display, wherein the displaying includes positioning an avatar in at least some of the user's image;
displaying a second avatar in a second position in the display, the second avatar providing an indication for the user to move so the first avatar moves from the first position to the second position in the display,
wherein the second avatar is indicative of a first movement pattern and a second movement pattern to be performed by the user to move the first avatar to the second position, wherein the first movement pattern includes one or more movements of the user to the left, right, front or back in relation to the camera, and wherein user movement in connection with the second movement pattern is different from the one or more movements associated with the first movement pattern, and
wherein one or more graphical characteristics of the first avatar change during the movement to the second position according to the first movement pattern and the second movement pattern; and
authenticating the user based on the movement.

25. The method of claim 24, wherein displaying the first avatar in the display includes displaying the first avatar in a position corresponding to the user's position in the captured image.

26. The method of claim 24, wherein the method further comprises detecting spoofing by reviewing movement of the user relative to the user's background.

* * * * *